United States Patent [19]
Yuen

[11] 3,829,583
[45] Aug. 13, 1974

[54] MIXTURE OF MALTOBIONIC ACID AND MONOSODIUM GLUTAMATE AS A FOOD SEASONING

[75] Inventor: Shokichi Yuen, Okayama, Japan

[73] Assignee: Ken Hayashibara, Okayama-ken, Japan

[22] Filed: Feb. 14, 1972

[21] Appl. No.: 226,331

[30] Foreign Application Priority Data
Feb. 20, 1971   Japan.................................. 46-7714

[52] U.S. Cl................. 426/175, 426/212, 426/343, 426/350, 426/348, 426/364
[51] Int. Cl............................................. A23l 1/26
[58] Field of Search ........... 426/175, 212, 343, 350, 426/364, 348; 99/140 R, 140 N

[56] References Cited
UNITED STATES PATENTS
2,496,297   2/1950   Lockwood et al..................... 195/96
FOREIGN PATENTS OR APPLICATIONS
722,599   11/1965   Canada............................ 99/140 R OTHER PUBLICATIONS
Chemical Abstracts, Vol. 75, 1971, p. 88, 654643W.
Abstracting South African 70 3,745 (14 Dec. 1970).
Chemical Abstracts, Vol. 75, 1971, p. 57, 119378t.
Abstracting Ger. Offen. 2,037,202 (27 May 1971).
Rodd, Chemistry of Carbon Compounds, Vol. 1, Part B, 1952, Elsevier Publ. Co., New York, p. 1292.

*Primary Examiner*—Joseph M. Golian
*Attorney, Agent, or Firm*—Hans Berman

[57] ABSTRACT

Maltobionic acid (4-glucosyl-gluconic acid) improves the taste of liquid and solid food, particularly when employed jointly with maltose and/or monosodium glutamate or the known combinations of monosodium glutamate with sodium 5'-inosinate and sodium 5'-guanylate. To be fully effective, the maltobionic acid should amount to more than one third of the combined weight of the monosodium glutamate, sodium 5'-inosinate and sodium 5'-guanylate, and the maltose, if present, should amount to more than five times the last-mentioned combined weight.

6 Claims, No Drawings

MIXTURE OF MALTOBIONIC ACID AND MONOSODIUM GLUTAMATE AS A FOOD SEASONING

This invention relates to seasonings for food, and particularly to a method of seasoning food, and to compositions for use in the method.

Monosodium glutamate has long been used for enhancing the taste of food, and it has been discovered more recently that its mixtures with sodium 5'-inosinate and sodium 5'guanylate produce an even more pleasant taste.

It has now been found that maltobionic acid (4-glucosyl-gluconic acid) further improves the taste of food seasoned with monosodium glutamate or with mixtures thereof with sodium inosinate and/or sodium guanylate, but is also a useful seasoning agent when employed alone. The seasoning effects of maltobionic acid are enhanced by the simultaneous presence of maltose.

Maltobionic acid with or without maltose is used to advantage in food ready to eat or drink, and in food which is yet to be cooked or subjected to other conventional heat treatment. When combined with monosodium glutamate with or without sodium inosinate and sodium guanylate, the maltobionic acid should amount to more than one third of the other components of the seasoning, and maltose, if simultaneously present, should amount to at least five times the combined weight of the monosodium glutamate and the inosinate and guanylate.

Maltobionic acid is a known compound that may be obtained from maltose by oxidation, and a seasoning composition of the invention may consist of or contain partly oxidized maltose as a source of both maltobionic acid and maltose.

Maltobionic acid alone has a mildly acid, pleasant taste which is not noticeable itself in foods seasoned with maltobionic acid, the latter enhancing and enriching the natural flavor of the food in a manner similar to the action of monosodium glutamate but without imparting to the food a taste of its own, as is often unavoidable with monosodium glutamate. This will be apparent from the following tests.

Hot water containing 0.66 percent common salt and 1.66 percent soy sauce was seasoned with 0.1 percent of the six compositions listed in the following Table, and the six liquids so produced were subjected to a preference test by a panel of six experienced tasters.

TABLE

| Composition No. | 1 | 2 | 3 | 4 | 5 | 6 |
|---|---|---|---|---|---|---|
| Monosodium glutamate | 88 | 95 | 88 | 92 | 80 | 80 |
| Sodium 5'-guanylate | 12 | 2.5 | 8 | 8 | 8 | 8 |
| Sodium 5'-inosinate | — | 2.5 | | | 12 | 12 |
| Sodium citrate | — | — | 4 | — | — | — |
| Maltobionic acid | — | — | — | — | 0.08 | *0.08 |
| Maltose | — | — | — | — | — | *1.1 |

* indicates the parts by weight against 0.1 parts of the total amount of above Monosodium glutamate, Sodium 5'-guanylate and Sodium 5'-inosinate Compositions Nos. 5 and 6 according to this invention were the first and second choice of all tasters, and the other four compositions, which were commercial products, trailed in the approximate order of Nos. 3, 4, 2, and 1.

Further tests performed by a panel of 20 women, 19–22 years old, indicated that the taste of a broth prepared from 500 ml water at 60°C, 3 g salt, and 8.5 ml soy sauce could be improved best by adding a combined amount of 0.1 percent monosodium glutamate, sodium inosinate, and sodium guanylate, based on the weight of the water, 1.25 percent maltose and 0.07 percent maltobionic acid on the same basis. No significant differences were found when the conventional ingredients were used in weight ratios of 92:4:4, 88:10:2, 84:2:14, 84:4:12, or 80:18:2, but the taste obtained without the maltose under otherwise unchanged conditions was considered slightly inferior. Adding vinegar to samples conventionally seasoned did not change the preference of the tasters, and vinegar added both to the conventionally seasoned samples and to samples seasoned according to the invention had the same effect.

Two batches of cucumber salad were prepared each from 200 g of a mixture of cucumbers and boiled and dried fish, one table spoon vinegar, two tea spoons soy sauce, ⅔ tea spoon salt, ½ table spoon sugar, one tea spoon Mirin (a fermentation product of waxy rice containing 13 percent – 22 percent alcohol and 25 percent – 38 percent sugar, a common ingredient in Japanese cooking and very sweet). One of the two batches was further seasoned with 0.2 g of a 92:4:4 mixture of monosodium glutamate, sodium 5'-inosinate, and sodium 5'-guanylate. The other batch was seasoned with 0.15 g maltobionic acid and 0.2 g of an 80:18:2 mixture of monosodium glutamate, sodium 5'-guanylate, and sodium 5'-inosinate.

The two batches were presented to a panel of 20 experienced tasters of whom 14 preferred the salad containing maltobionic acid, and the other 6 preferred the conventionally seasoned salad. The difference is statistically significant.

Two batches of egg soup were prepared from 500 ml water, 8.5 ml soy sauce, 3 g salt, and ½ egg. One was seasoned with 0.1 percent of the above 92:4:4 mixture, based on the weight of the water. The other batch was seasoned with 1.25 percent maltose, 0.075 percent maltobionic acid and 0.1 percent of the above 80:18:2 mixture. The latter soup was preferred by 15 of the 20 tasters, while five tasters preferred the soup without maltose and maltobionic acid. The difference is statistically significant.

A dip for "somen" noodles was prepared from 400 ml water, 100 ml soy sauce, and 60 ml Mirin. One batch was seasoned with 0.1 percent of the above 92:4:4 mixture, based on the weight of the water. Another batch was seasoned with 0.1 percent of the above 80:18:2 mixture and further with 1.0 maltose and 0.075 percent maltobionic acid. The latter dip was preferred by 16 members of a twenty-member panel of tasters.

More elaborate tests were performed on food ready to eat and food requiring cooking or other heat treatment such as instant soup, ham, sausages and other meat products, fresh and canned fish, tomato ketchup, fruit jelly, and pastry, prepared in a manner more fully illustrated below. The test indicated that very good results are obtained with mixtures of maltobionic acid with monosodium glutamate, sodium 5'-inosinate, and sodium 5'-guanylate in which the monosodium glutamate amounted to at least 80 percent of the combined weight of the same and the inosinate and guanylate, the maltobionic acid amounted to more than one third, and preferably to ½ to twice that combined weight, and that further improvement can be achieved by adding maltose in an amount of more than five times and preferably more than ten times the weight of the glutamic acid plus any inosinate or guanylate present. Larger amounts of maltose add their own somewhat sweet taste to the seasoning.

Mixtures of maltobionic acid with the sodium salts of glutamic, inosinic and/or guanylic acid are preferably prepared as pre-mixed seasoning compositions prior to their addition to food, and such seasoning compositions may be dry mixtures in the form of powders or granules, semi-solid pastes containing 30 percent to 50 percent water, or aqueous liquids. Regardless of the ultimate form chosen, it is preferred to mix at least one of the ingredients in the form of an aqueous solution with the others, and to dry the mixtures in any conventional manner, the ingredients being stable at all normal processing temperatures and nonvolatile. The dry powders or granules are free-flowing.

The degree of dissociation of maltobionic acid is very low, and the change in the pH of a food mixed with the small effective amounts of maltobionic acid is usually negligible. If relatively large amounts of maltobionic acid are intended to be used in food whose quality depends on a precisely maintained pH value, the maltobionic acid may be employed in the form of its equally effective sodium or potassium salts since only the anionic moiety of maltobionic acid is essential to the desired result.

Obviously, other seasoning materials may be employed jointly with the seasoning compositions of the invention, and the compositions thus may contain ingredients other than maltobionic acid, maltose, sodium monoglutamate, sodium inosinate, and sodium guanylate.

The following Examples further illustrate the preparation of seasoning compositions of the invention and their use.

EXAMPLE 1

92 kg Monosodium glutamate, 4 kg sodium 5'-guanylate, and 4 kg sodium 5'-inosinate were mixed, and the mixture was stirred into 1,250 kg powdered maltose, 90 percent pure, and containing 4.5 percent moisture. The practically homogeneous pulverulent material was placed in a fluidized bed dryer of the horizontal type and agitated by means of air at 70°C while 150 liter of a 50 percent maltobionic acid solution was sprayed on the fluidized bed.

The product continuously discharged from the dryer consisted of granules having a diameter of 0.54 mm and a uniform composition including 7 percent moisture. They were handled easily without dusting and readily dissolved in water. They were added to food at a rate of 0.07 percent to 0.15 percent.

EXAMPLE 2

A mixture of 80 kg monosodium glutamate, 18 kg sodium 5'-guanylate, and 2 kg sodium 5'-inosinate was placed in the afore-described dryer, and was sprayed there with 1,500 liters of an aqueous 50 solution of maltose and maltobionic acid in a weight ratio of 10:1 obtained by partial enzymatic oxidation of maltose.

The resulting granules had a particle size of 30 to 10 mesh, were free from dust, and quickly dissolved in water.

EXAMPLE 3

88 kg Monosodium glutamate, 10 kg sodium 5'-guanylate, and 2 kg sodium 5'-inosinate were added to 1,500 liter 50 percent aqueous solution of maltose, 91 percent pure. 75 kg Maltobionic acid were also added, and the mixture was thoroughly mixed to produce a uniform suspension. The suspension was sprayed into hot air in a chamber to evaporate the water, and the residual fine powder was collected. Its particle size was 100 to 30 mesh, and it contained 6 percent moisture. It dissolved readily in water.

EXAMPLE 4

The mixture of sodium glutamate, guanylate, and inosinate referred to in Example 2 was placed in a tank equipped with a stirrer and a heating jacket, and a 75 percent solution of maltobionic acid in water was gradually added until granules were formed. The granular material was forced through a screen having openings of 3 mm. It was particularly convenient to handle in the processing of large batches of food.

EXAMPLE 5

Frozen fish including tuna, marlin, bonito, mackerel, and others was thawed and ground on a meat mincer. The minced material was seasoned with 3.5 percent salt, 2 percent sugar, 0.2 percent monosodium glutamate, 1 percent maltose, and 0.1 percent maltobionic acid. The pH was held at not less than 6.0. Spices mainly consisting of pepper were added, as well as about 2 to 3 ml of an artificial smoked-flavor composition per kilogram of fish. Lard was added to raise the content of edible fat to 5 percent, and potato starch in an amount of 5 percent of the fish. Ultimately a commercial preservative and red coloring agent were admixed, the mixture was again passed through a grinder and stuffed immediately into sausage casings.

The sausages so produced were sterilized by heating at 85° to 95°C for one hour, cooled by immersion in cold water, and thereafter briefly dipped in hot water to stretch the casing until wrinkles disappeared.

EXAMPLE 6

A piece of lean beef was steeped for approximately one to two days in water containing 3 percent salt and 3 percent sodium nitrate, and thereafter immersed in boiling water for 20 to 30 minutes. It was then cooled and cut into slices 5 to 7 mm thick. 10 kg of the slices were cooked 10 – 15 minutes in 2.5 liter of the following mixture:

| Soy sauce | 10 l | Onion | 40 g |
| Starch | 50 g | Maltobionic acid | 25 g |
| Maltose | 500 g | Soup stock | 500 ml |
| Sugar | 2 kg | Fresh ginger | 60 g |

The partly cooked slices were packed in cans together with 40 percent (by volume) of the above mixture and 15 percent (by volume) ginger slices. The cans were covered, deaerated at 100°C for 30 minutes, and then sealed. The sealed cans were sterilized at 110°C for 60 minutes.

The preserve of beef cooked with soy sauce and seasoned with ginger is known as "Yamatoni".

EXAMPLE 7

A powdered soup mix was prepared from 12 percent corn starch, 1.5 percent beef extract, 7 percent vegetable soup concentrate, 10 percent powdered milk, 3 percent salt, 1 percent sugar, 2 percent seasoning, 1.0 percent maltobionic acid, 5 percent maltose, 2 percent vegetable powder, 0.1 percent spices, 5 percent butter, and water.

The beef extract, vegetable soup concentrate, powdered milk, salt, and sugar were dissolved in the water and heated in a steam-jacketed pan to evaporate most of the water. The concentrate was added to the starch and mixed vigorously. The mixture was further heated until the water content was reduced to 10 percent, thereafter cooled, and further dried to a powder at moderate temperature. To the product so obtained were added the seasoning, maltobionic acid, maltose, vegetable powder and spices with vigorous agitation, and the previously melted butter was poured into the pulverulent mass. The latter was further ground under drying conditions until its water content was reduced to 3 percent whereupon it was packed. Its taste was superior to an otherwise identical product not containing the maltobionic acid and maltose.

It should be understood, of course, that the foregoing disclosure relates only to preferred embodiments of the invention, and that it is intended to cover all changes and modifications of the examples of the invention herein chosen for the purpose of the disclosure which do not constitute departures from the scope and spirit of the invention set forth in the appended claims.

What is claimed is:

1. A method of improving the taste of food which comprises seasoning said food with maltobionic acid and monosodium glutamate, the weight of said maltobionic acid being more than one third of the weight of said monosodium glutamate, and the amount of said monosodium glutamate being sufficient to improve said taste in the absence of said maltobionic acid.

2. A method as set forth in claim 1, wherein said weight of said maltobionic acid is such that the taste of said maltobionic acid is not noticeable in said food.

3. A method as set forth in claim 1, wherein said food is additionally seasoned with an amount of maltose greater than five times the weight of said monosodium glutamate.

4. A seasoning composition containing maltobionic acid and monosodium glutamate, the weight of said maltobionic acid being greater than one third of the weight of said monosodium glutamate, and the amount of said monosodium glutamate being sufficient to improve the taste of hot water containing 0.66 percent common salt and 1.66 percent soy sauce when said composition is added to said hot water in an amount of 0.1 percent.

5. a composition as set forth in claim 4, wherein the weight of said maltobionic acid is such that the taste of said maltobionic acid is not noticeable in said hot water.

6. A composition as set forth in claim 4, further containing maltose in an amount greater than the weight of said maltobionic acid.

* * * * *